United States Patent [19]

Leinen

[11] Patent Number: 5,287,889
[45] Date of Patent: Feb. 22, 1994

[54] LOW-NOISE ROTARY CONTROL VALVE

[76] Inventor: Christopher M. Leinen, 8420 Rayson, Houston, Tex. 77080

[21] Appl. No.: 949,459

[22] Filed: Sep. 22, 1992

[51] Int. Cl.$^5$ .............................................. F16K 5/10
[52] U.S. Cl. .............................. 137/625.3; 137/625.32; 251/127
[58] Field of Search ..................... 137/625.32, 625.3; 251/127

[56] References Cited

U.S. PATENT DOCUMENTS

| 223,573 | 1/1880 | Ainsworth et al. | 137/625.32 X |
| 3,880,191 | 4/1975 | Baumann | 137/625.32 |
| 4,774,984 | 10/1988 | Peters | 137/625.32 |
| 5,070,909 | 12/1991 | Davenport | 137/625.32 |

Primary Examiner—Arnold Rosenthal
Attorney, Agent, or Firm—Bush, Moseley & Riddle

[57] ABSTRACT

An improved low-noise rotary control valve is disclosed. Such valve includes a valve body (10) and a rotatable ball (12) mounted within the valve body. The improvement includes an upwardly extending diverter (28) in the entry flow passage (15) of the valve body (10). A downwardly extending diverter (30) is disposed on the leading edge of the upper half (50) of the valve (12). Such diverters (28, 30) provide only small impedance to flow when the rotary control valve is in the full open position, but provide a tortious path for fluid flow through the valve (20) when it is partially closed. Such tortious path of the fluid inhibits vortex formation within the flow passage of the valve (14) with the result that vibration and noise are reduced. A third impediment placed in the outlet flow passage (16) extends upwardly from the valve and inhibits vortex formation downstream of the valve. Transverse passages (40) in the lower portion (52) of the ball (12) are also provided to reduce vibration and noise as fluid passes through the valve.

3 Claims, 2 Drawing Sheets

LOW-NOISE ROTARY CONTROL VALVE

BACKGROUND OF THE INVENTION

1. Field of the Invention

This invention relates generally to rotary control valves such as ball valves or cylindrical plug valves. More particularly, the invention relates to such valves which are modified to reduce noise and vibration produced during partial closure of such valves.

2. Description of the Prior Art

The volumonous prior art of rotary control valves has searched for solutions to the problem of noise generation during throttling operation of such valves. U.S. Pat. No. 5,070,909 to Davenport tries to solve the problem by placing parallel conduits in entry and exit flow passages of the valve body and also placing similar conduits in the flow path of the ball valve in the valve body. Additionally, transverse holes between channels are provided in the ball valve.

U.S. Pat. No. 4,774,984 to Peters discloses a cylindrical plug valve with the plug having a flow passage through it dividing the plug into two halves. One half serves to close the flow passage of the valve when it is in a fully closed position. The other half has channels provided in it, such that when the valve is in a throttling position, fluid is partially directed through the channels in the plug element. Such channels are provided in the plug in an effort to decrease flashing and cavitation of the fluid through the valve so as to reduce noise.

U.S. Pat. No. 4,530,375 to Bey discloses an attenuating rotating valve in which the rotating closure member or valve element may be rotated from a fully closed position to a throttling position to a fully open position. A fixed attenuating element within the flow passage of the valve includes transverse channels in it through which fluid must pass when the valve is in a throttling position.

U.S. Pat. No. 4,364,415 to Polon discloses still another throttling ball valve in which the interior of the flow passage of the ball valve element includes longitudinal baffles which require fluid passing through the valve when it is in a throttling position to traverse a tortious back and forth longitudinal path to the valve exit passage.

All of the valves identified in this description of prior art are characterized by high cost in fabricating attenuation devices within the valve.

3. Identification of objects of the Invention

A primary object of this invention is to provide an improved rotary-control valve that is characterized by simplicity and low cost, yet is effective in reducing noise during throttling operation of the valve.

SUMMARY

The object identified above, as well as other advantages and features are incorporated in a rotary control valve that includes a valve body and a rotatable ball mounted within the valve body. The valve body includes an entry flow passage and an exit flow passage separated by the ball valve element which includes a flow passage through it which generally separates the valve element into an upper portion and a lower portion. An upwardly extending flow diverter is placed in the entry flow passage of the valve body. A downwardly extending impediment or flow diverter is provided on the leading or forward edge of the upper portion of the valve element.

The flow passage diverter and the valve element diverter provide minor impedance to fluid flow when the rotary control valve is in the full open position, but provide a tortious path for fluid flow through the valve when the valve is in a throttling position. Such tortious path of the fluid inhibits vortex formation within the valve element. As a result, vibration and noise are reduced.

A third impediment or exit flow diverter extends upwardly into the outlet flow passage of the valve body from the valve element. Such exit flow diverter inhibits vortex formation downstream of the valve. Transverse passages in the lower portion of the ball valve element may also be provided to reduce vibration and noise as the fluid passes through the valve.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
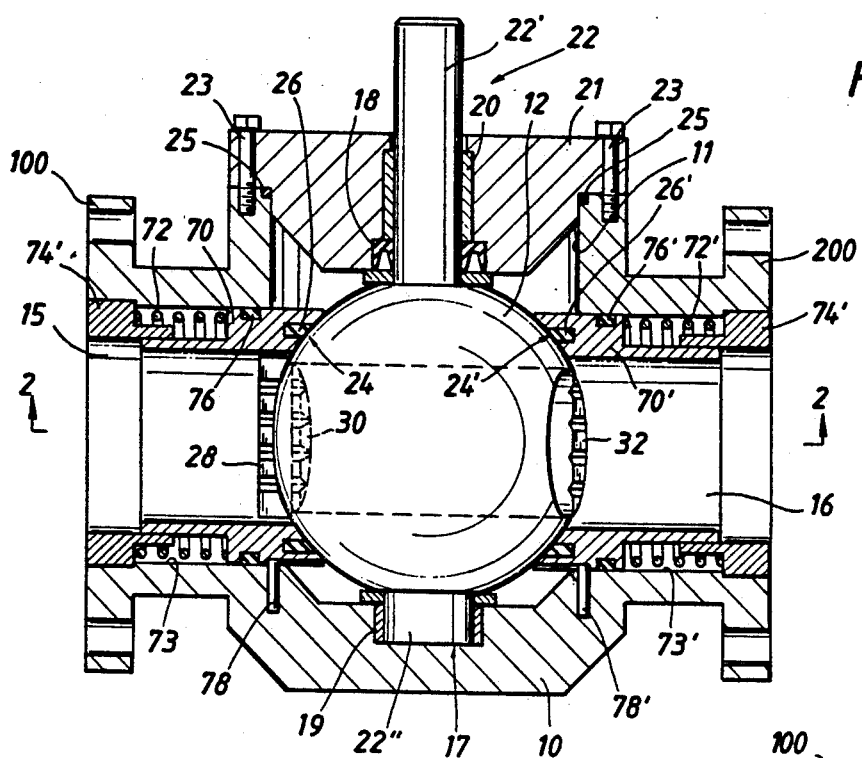
FIG. 1 presents a side view of the ball valve with the valve body shown in section in the longitudinal direction of the flow passage.

FIG. 1 of the drawings shows the reduced noise throttling valve of the invention. A side view of a ball (closure member) 12 shows that it is installed in a side port or a side entry 11 of valve body 10.

Such ball valve 12 is installed within valve body 10 where the entry sleeve 70, entry spring 72 and entry plug 74 and exit sleeve 70', exit spring 72' and exit plug 74' are removed from valve body 10. Ball valve 12 includes an actuating stem 22 comprising an outer portion 22' and an inner portion 22". The valve body 10 includes a recess 17 into which a sleeve 19 is fixed. On insertion of the ball valve 12 and actuating stem 22 into side entry 11, the inner portion of the actuating stem 22" is inserted into sleeve 19.

On the other side of the ball valve 12, a side entry plug 21 is provided which is fastened to valve body 10 for example by bolts 23 into threaded holes of the valve body 10. A gland packing 18 and gland 20 enable the outer portion 22' of actuating stem 22 to turn with respect to side entry plug 21 yet prevent pressurized fluid from escaping to the exterior of the valve. The inner portion 22" of actuating stem 22 rotates within sleeve 19. "O" ring 25 seals the side entry plug 21 with respect to valve body 10.

After the ball valve has been installed via side entry 11, entry retaining pin 78 and exit retaining pin 78' are installed in valve body 10. Next, entry sleeve 70 is inserted via entry port 73 until it is stopped by entry retaining pin 78. Exit sleeve 70' is inserted via exit port 73' until it is stopped by exit retaining pin 78'.

Spring 72 is placed between a shoulder of entry sleeve 70 and an entry plug 74 which may be fastened within entry port 73 by threading or the like. Likewise, spring 72' is placed between a shoulder of exit sleeve 70' and exit plug 74' by threading or the like. Springs 72 and 72' force sleeves 70 and 70' into proper position adjacent the exterior of ball valve 12. "O" ring seals 26 on the entry side and 26' on the exit side are placed in recesses 24 and 24'. Such "O" rings seal the ball valve 12 to the entry and exit sleeves so as to prevent fluid pressure from escaping from entry flow passage 15 to exit flow passage 16. "O" ring seals 76 and 76' seal the entry sleeve 70 and the exit sleeve 70' from the space between the ball valve 12 and the valve body 10.

As mentioned above, an entry flow passage is defined within the interior of entry plug 74 and entry sleeve 70. An exit flow passage is defined within the interior of exit plug 74' and exit sleeve 70'. Ball valve 12 includes a bore or passage 14 through which it may be axially aligned with the longitudinal axis 85 of the valve. (See FIG. 2)

Figure 4:
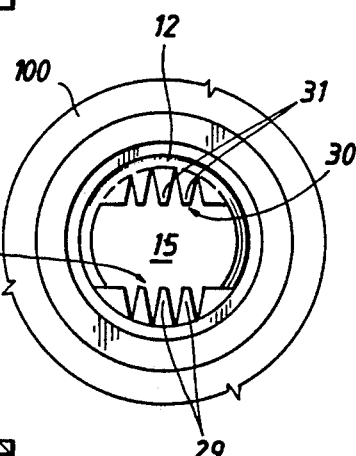
FIG. 4 is a view looking into the valve along lines 4—4 of FIG. 3 which illustrates a preferred embodiment of the impediments or flow diverters at the entry into the flow passage of the ball element of the valve.
Figure 2:
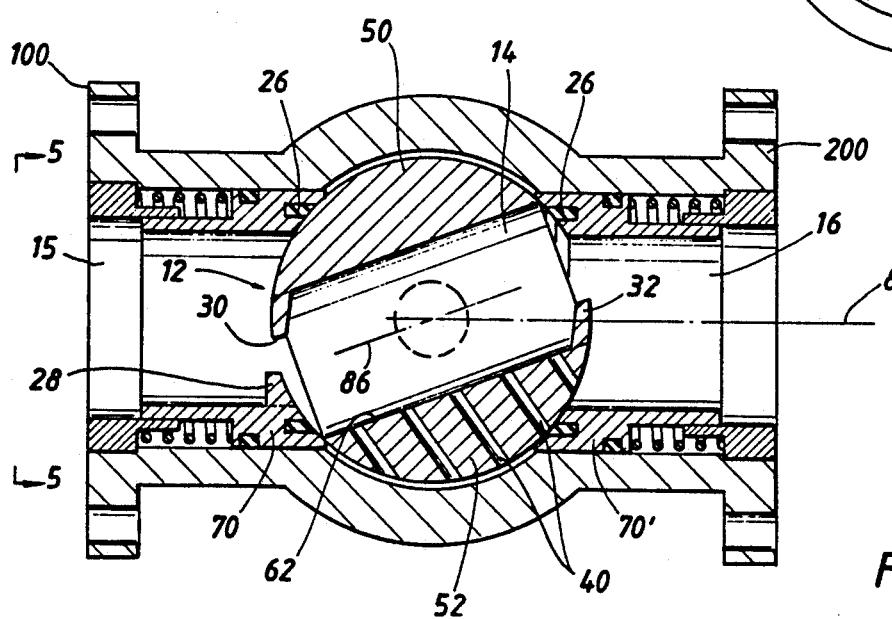
FIG. 2 is a section through the valve of FIG. 1 at the middle of the flow passage as viewed in the direction of the valve actuating stem, where the valve is in a throttling or partially closed position.
Figure 5:
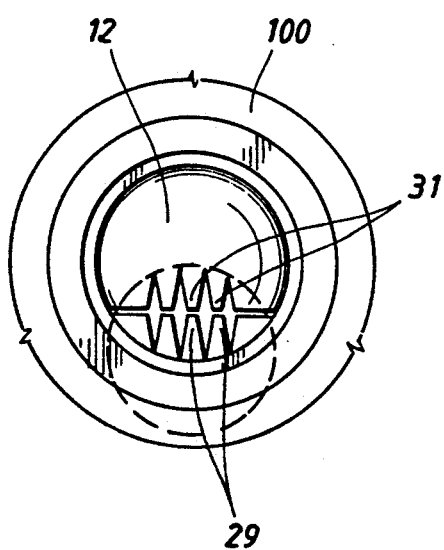
FIG. 5 is a view looking into the valve along lines 5—5 of FIG. 2 which illustrates the relative positions of the flow diverters with the ball element of the valve partially closed.
Figure 6:
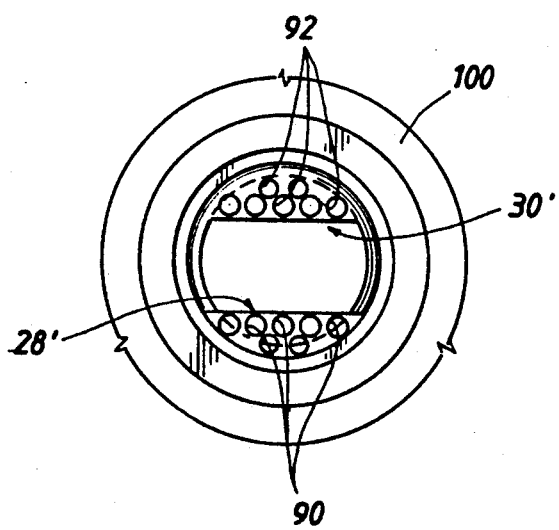
FIG. 6 is a view similar to that of FIG. 4 but shows an alternative construction of the impediments or flow diverters.

FIG. 2 best illustrates the impediments or flow diverters 28, 30 and 32 of the throttling valve of this invention. Flow diverter 28 rises upwardly from entry sleeve 70 or from valve body 10 into entry flow passage 15. Such diverter 28 preferably includes teeth 29 as illustrated in FIG. 4 or may alternatively include longitudinal passages 90 as illustrated in FIG. 6. Extending downwardly from the leading or forward edge of the upper portion 50 of ball element 12 is another flow diverter or impediment 30. Preferably such diverter 30 includes teeth as illustrated in FIGS. 4 and 5, but alternatively, as illustrated in FIG. 6, passages or holes 92 may be provided.

The illustrated condition of the throttling valve of FIG. 2 is one of partial closure. In such condition the longitudinal axis 86 of the flow passage 14 of ball 12 forms an angle with the longitudinal axis 85 of inlet 15 and outlet 16 flow passages and valve body 10. Pressurized fluid passes by and through flow diverters 28 and 30 on its way to exit flow passage 16. Such impediments inhibit vortex formation and break flow into smaller streams within ball flow passage 14 thereby reducing vibration and noise as well as reducing cavitation. Diverter 32 extends upwardly from lower portion 52 of ball 12 into outlet passage 16 so as to inhibit vortex formation downstream of outlet passage 16 and thereby reduce cavitation and noise generation at the outlet of the valve.

As an additional means for vortex prevention within flow passage 14 of ball 12, a plurality of transverse passages 40 are provided in lower portion 52 of ball valve element 12. With increasing rotation of ball valve element 12, more passages 40 are open to outlet passage 16 thereby providing alternative paths for pressurized fluid within passage 14 to reach the outlet 16. Such alternative paths further inhibit vortex creation in passage 14 and serve to reduce valve noise when a compressible fluid, such as gas, is being throttled through the valve.

Figure 3:
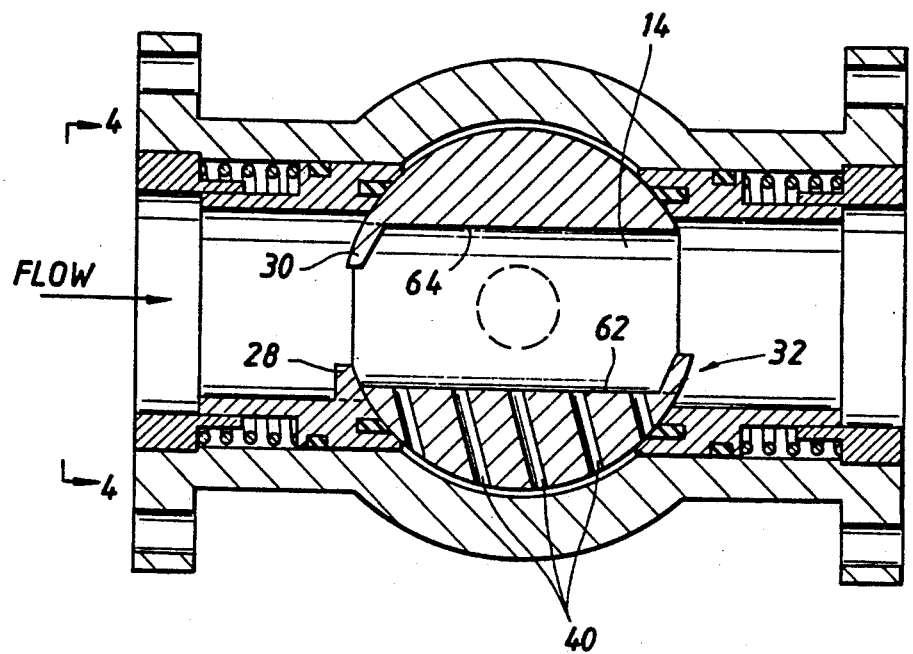
FIG. 3 is a section through the valve similar to that of FIG. 2 but showing the valve in a fully open position.

FIG. 3 illustrates the valve of the invention in a fully open condition. The flow diverters 30, 28 and 32 restrict flow only a small amount in such fully open condition. FIG. 4 illustrates the opening into the passage 14 via inlet passage 15. Teeth 29 and 31 are spread a substantial distance apart, such that the teeth provide only small impedance to flow when the valve is in the fully open position. Preferably, the teeth 31 of flow diverter 30 are aligned with the teeth 29 of flow diverter 28. Flow diverter 28 is fixed and separated a small longitudinal distance from diverter 30. As a result, as the valve member 12 is rotated to a throttling condition as illustrated in FIGS. 2 and 5, the teeth 31 of diverter 30 close toward the teeth 29 of diverter 28. The teeth of diverter 30 rotate past the teeth of diverter 28 until at closure, the outer surface of top portion of valve member 12 closes the flow passage 15.

The diverter 32 of the lower portion 52 of ball 12 which extend upwardly into the outlet flow passage preferably includes upwardly facing teeth similar to teeth 29 of inlet diverter 28.

As mentioned above, FIG. 6 illustrates an alternative embodiment of a diverter 28' having holes or passages 90 through it with a closure member diverter 30' having holes 92 through it.

Although it is preferred that valve member 12 be a ball, plug valve elements could be provided with proper rearrangement of valve body 10, and other valve parts. Such plug valve element could be of cylindrical shape.

While several embodiments of the present invention have been illustrated in detail, it is apparent that modifications and adaptations of the embodiments shown will occur to those skilled in the art. For example, although a side entry is provided for the ball 12 within valve body 10, other valve structures may be substituted for the side entry design. Such other structures are well known in the ball valve design art. However, it is to be expressly understood that such modifications and adaptations are within the spirit and scope of the present invention as set forth in the following claims.

What is claimed is:

1. A valve assembly including
   a valve body (10) having entry and exit flow passage (15, 16) formed therethrough, said entry and exit flow passages defining a longitudinal axis,
   a valve member (12) having a passage (14) extending therethrough, said passage dividing said valve member into an upper portion (50) and a lower portion (52),
   means for mounting said valve member in said valve body for rotation about a lateral axis with respect to said valve body between a completely open position and a completely closed position,
   sealing means (26) provided in said valve body flow passage for operatively engaging said valve member for preventing fluid flow through said flow passage (16) past said valve member (12) once said valve member is in said closed position,
   an improvement comprising,
   an entry flow passage diverter (28) disposed in said entry flow passage (15) of said valve body (10) at a position adjacent said valve member,
   an entry valve member diverter (30) disposed on a edge of said valve member (12), which faces said entry flow passage (15),
   said flow passage diverter (28) and valve member diverter (30) cooperatively arranged and sized in relation to said valve member passage (14) through said valve member (12) to present limited impedance to fluid flow from said entry flow passage (15) of said valve body when said valve member is rotated to a completely open position with respect to said valve body, said flow passage diverter (28) and said valve member diverter (30) cooperating to increasingly restrict flow from said entry flow passage (15) to said valve member passage (14) as said valve member is increasingly rotated from said open position toward said closed position, wherein said flow passage diverter (28) extends upwardly from said valve body into said entry flow passage, and wherein said entry valve member diverter (30) extends downwardly from an upper portion (64) of said passage (14) through said valve member (12), and wherein a plurality of transverse passages (40) are disposed through said lower portion (52) of said valve member (12), whereby a portion of fluid within said valve member passage (14) may be channelled through said lower portion (52) in alternative paths to said exit flow passage (16) from said valve member passage (14).

2. A valve assembly including a valve body (10) having entry and exit flow passage (15, 16) formed therethrough, said entry and exit flow passages defining a longitudinal axis, a valve member (12) having a passage (14) extending therethrough, said passage dividing said valve member into an upper portion (50) and a lower portion (52), means for mounting said valve member in said valve body for rotation about a lateral axis with respect to said valve body between a completely open position and a completely closed position, sealing means (26) provided in said valve body flow passage for operatively engaging said valve member for preventing fluid flow through said flow passage (16) past said valve member (12) once said valve member is in said closed position, an improvement comprising, an entry flow passage diverter (28) disposed in said entry flow passage (15) of said valve body (10) at a position adjacent said valve member, an entry valve member diverter (30) disposed on a edge of said valve member (12), which faces said entry flow passage (15), said flow passage diverter (28) and valve member diverter (30) cooperatively arranged and sized in relation to said valve member passage (14) through said valve member (12) to present limited impedance to fluid flow from said entry flow passage (15) of said valve body when said valve member is rotated to a completely open position with respect to said valve body, said flow passage diverter (28) and said valve member diverter (30) cooperating to increasingly restrict flow from said entry flow passage (15) to said valve member passage (14) as said valve member is increasingly rotated from said open position toward said closed position, wherein said flow passage diverter (28) extends upwardly from said valve body into said entry flow passage, and wherein said entry valve member diverter (30) extends downwardly from an upper portion (64) of said passage (14) through said valve member (12), and wherein said flow passage diverter (28) includes a plurality of teeth (29) extending upwardly from said flow passage (15) of said valve body, and wherein said entry valve member diverter (30) includes a plurality of teeth (31) extending downwardly from said upper portion (50) of said valve member.

3. The improvement of claim 2 wherein said teeth (29) of said entry flow passage diverter (28) are aligned vertically with said teeth (31) of said valve member diverter (30), but said teeth (29, 30) are separated by a small longitudinal distance along said valve body (10) such that said teeth (30) of said entry valve member diverter rotate past said teeth (29) of said entry flow passage (15).

* * * * *